United States Patent [19]

Valassis

[11] 3,750,114

[45] July 31, 1973

[54] CHARGE COUPLED ELECTRONIC LINE SCANNER

[75] Inventor: John G. Valassis, Elmwood Park, Ill.

[73] Assignee: GTE Automatic Electric Laboratories Incorporated, Northlake, Ill.

[22] Filed: Mar. 10, 1972

[21] Appl. No.: 233,644

[52] U.S. Cl. .. 340/173 LS, 179/18 AB, 179/18 GF, 340/166 EL, 340/173 LM, 340/173 LT

[51] Int. Cl. ... G11c 7/00, G11c 11/42, G11c 11/50

[58] Field of Search ............... 340/173 LS, 173 LM, 340/173 PL, 166 EL, 173 LT; 179/18 AB, 18 GF

[56] References Cited

UNITED STATES PATENTS

| | | | |
|---|---|---|---|
| 3,440,620 | 4/1969 | French | 340/173 LS |
| 3,573,383 | 4/1971 | Lauwers Muizen | 179/18 AB |
| 3,622,710 | 11/1971 | Tothill | 179/18 GF |
| 3,499,158 | 3/1970 | Lavine | 340/173 LS |
| 3,609,713 | 9/1971 | Wooton | 340/173 LM |
| 3,585,318 | 6/1971 | Fuchs | 179/18 AB |
| 2,805,360 | 9/1957 | McNaney | 340/173 LS |

OTHER PUBLICATIONS

Snyder, Sequence Indicator, 2/69, IBM Technical Disclosure Bulletin, Vol. 11, No. 9, pp. 1166–1167.

Altman, New MOS Technique Points Way to Junctionless Devices, 5/11/70, Electronics, pp. 112–118.

Altman, The New Concept for Memory and Imaging: Charge Coupling, 6/21/71, Electronics, pp. 50–59.

*Primary Examiner*—Terrell W. Fears
*Assistant Examiner*—Stuart N. Hecker
*Attorney*—K. Mullerheim, Robert F. Van Epps et al.

[57] ABSTRACT

There is herein disclosed an electronic line scanner wherein a light emitting diode array is used to monitor the status of the supervised lines. The diode array is disposed adjacent a charge coupled semiconductor device which is operated in a shift register mode to write the binary line status information into a random access memory.

12 Claims, 1 Drawing Figure

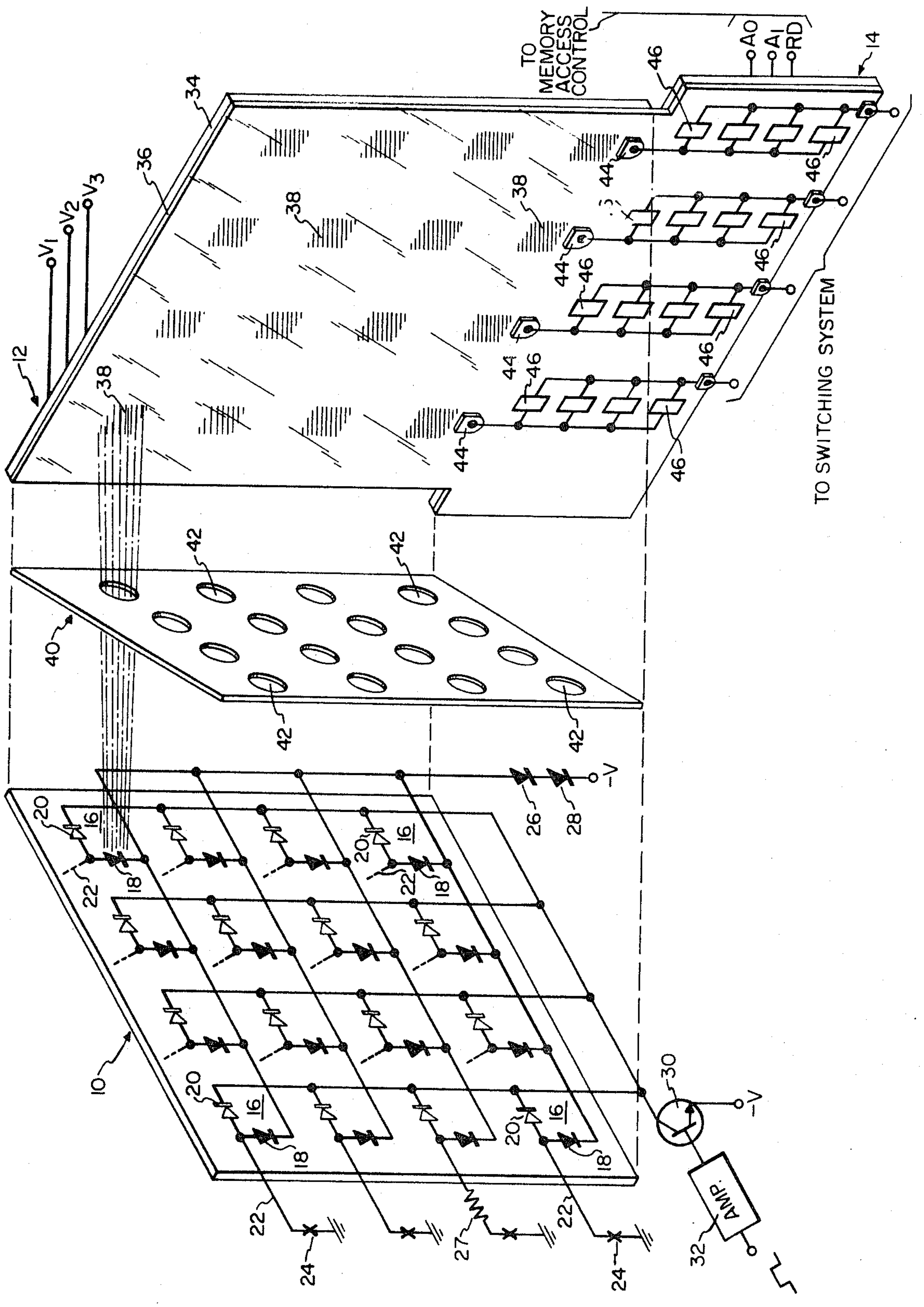
TO MEMORY ACCESS CONTROL
AO
A1
RD
TO SWITCHING SYSTEM
V1
V2
V3
-V
AMP.

CHARGE COUPLED ELECTRONIC LINE SCANNER

BACKGROUND OF THE INVENTION

1. Field of the Invention

The present invention relates generally to the field of electronic scanners and more particularly to a new and improved line scanning arrangement of utility in electronic telephone switching systems.

2. Description of the Prior Art

Prior to the present invention a wide variety of telephone line scanning matrices have been conceived. These matrices have been of both the electromagnetic type such as disclosed in the co-pending application Ser. No. 205,806, now U.S. Pat. No. 3,714,556 of Frank A. Risky entitled Electromagnetic Scanpoint Matrix with Integrated Testing Means and the electronic type as described in the co-pending application Ser. No. 158,009, now U.S. Pat. No. 3,713,104, of Frederick A. Stich, entitled Electronic Scanpoint Matrix. Both of these applications are assigned to the assignee of the present application.

Although the line scanners described in the above-referenced co-pending applications have been found to perform adequately with the conventional electromechanical telephone switching systems, they typically do not provide the high degree of noise isolation that is desired between the modern electronic switching systems and the points to be supervised.

OBJECTS AND SUMMARY OF THE INVENTION

From the preceding description it will be understood that among the various objectives of the present invention are included:

the provision of a new and improved electronic line scanning apparatus;

the provision of apparatus of the above-described character which exhibits a high noise isolation characteristic; and the provision of apparatus of the above-described character having a high virtual electronic scanning speed.

The foregoing as well as other objectives of the present invention are efficiently achieved by providing a light emitting diode array coupled to the lines to be monitored. The diode array is disposed adjacent a charge coupled semiconductor device such that a lighted diode produces a minority charge accumulation distribution at corresponding potential wells of the charge coupled semiconductor device. The charge coupled device is operated as a shift register and is coupled to the storage cells of a random access memory into which the binary line status information is written. The memory is then conventionally accessed to read out the line status.

These and other objects, features and advantages of the present invention will become more apparent from the following detailed description taken in conjunction with the appended drawing.

BRIEF DESCRIPTION OF THE DRAWINGS

The single FIGURE appended hereto is a partially schematic and partially perspective view of an electronic line scanner constructed in accordance with the principles of the present in-vention.

DESCRIPTION OF THE PREFERRED EMBODIMENT

Turning now to the FIGURE there are shown in a perspective schematic form a four by four matrix 10 of light emitting diode scanpoints, a charge coupled semiconductor device 12 and a random access memory 14 each of which will be described in detail hereinbelow.

Each scanpoint 16 comprises a light emitting diode 18 and a current sink diode 20 coupled together at their respective anodes to a signal line 22 to be monitored which includes electrical contacts 24, which will be either open or closed depending upon the status of the line. The cathodes of all of the light emitting diodes are coupled in parallel through level shift diodes 26 and 28 to the conventional -48 vdc central office battery. Line resistance is presumed to be greater than 500 ohms. If it is not, a series resistance 27 in the line will be required. The cathodes of the current sink diodes 20 are coupled in common to the collector of transistor switch 30. The emitter of transistor 30 is coupled to the -48 vdc central office battery and the base is coupled through a suitable amplifier 32 to a source of scanpoint interrogation pulses, $P_{NT}$. With this arrangement a monitored line 22 having closed contacts 24 will be coupled to the central office battery, -48 vdc, through the current sink diode 20 and transistor 30 rather than through the light emitting diode 18. During interrogation the application of a current pulse turns transistor 30 off and the line current will flow through those light emitting diodes which are coupled to lines 22 having closed contacts 24. Those light emitting diodes coupled to lines 22 with closed contacts 24 will thus glow during the application of an interrogation pulse as illustrated at the upper right of the matrix 10 and those coupled to lines with open contacts will remain dark.

A lighted/dark pattern corresponding to the status of the monitored lines will thus be produced whenever the matrix is interrogated. For efficiency of fabrication it is preferred that the diode matrix 10 be formed by diffusion or other suitable techniques on a silicon or other type wafer. The external electrical connections to the diodes on such a wafer may conveniently be made via first and second metalization pads of conventional type.

The charge coupled semiconductor device 12 is a relatively recent development wherein minority carriers are stored in a spatially defined depletion region or potential well at the surface of a homogeneous semiconductor and are moved about the surface by moving the potential minimum. The charge coupled semiconductor device is described in detail in a brief entitled Charge Coupled Semiconductor Devices by W. S. Boyle and G. E. Smith published in The Bell Bystem Technical Journal, Vol. 49, No. 4 dated April 1970. When the charge coupled device is formed of a layer 34 of silicon dioxide on a silicon substrate 36 the incidence of light on the silicon substrate will produce a minority charge accumulation distribution in respective potential wells 38 in the charge coupled device corresponding to the incident light pattern.

By placing the light emitting diode scanpoint matrix 10 in close physical proximity to the substrate 36 of a charge coupled semiconductor device 12 the lighted/-dark pattern of the matrix during interrogation pulses will produce a minority charge accumulation distribution at the surface of the semiconductor material in a corresponding pattern. An opaque mask 40 having apertures 42 corresponding to each light emitting diode 18 in the matrix 10 may be interposed between the matrix 10 and the charge coupled device 12 to minimize light dispersion. The voltages $V_1$, $V_2$ and $V_3$ applied to the charge coupled device are manipulated as described by Boyle and Smith to shift the potential minima and thus move the charge accumulations to the outputs 44 of the device. As the charge coupled device 12 is interrogated by shifting, the signals at the outputs 44 will be either "1" or "0" depending upon the presence or absence of a minority charge accumulation in the adjacent potential well 38.

The charge coupled device 12 output may be recirculated to a minority charge generator (not shown) and the device would then store the line status information. Since the interrogation of the charge coupled device is serial, the worst case access time for reading out the line status information is equal to four times the shift rate. In order to improve this access time it is preferred in the practice of this invention to couple the outputs 44 of the charge coupled device 12 to the storage cells 46 of a random access memory 14. The memory 14 is contemplated as being of conventional construction, however, for efficiency of fabrication it is preferred to be of the metal oxide semiconductor type whereby the charge coupled device 12 and memory 14 may be formed on a common silicon substrate 36. With such an arrangement a virtual electronic scanning speed on the order of nanoseconds is provided while the actual contact scanning rate remains compatible with the speed of electromechanical contact operation (i.e., on the order of milliseconds).

In some electronic telephone system applications such as local contact scanning there is no requirement that the scanning device provide a continuous path for the scanning current to flow. In such applications it is possible to eliminate the current sink diodes 20 and to merely couple the anodes of the light emitting diodes 18 to the monitored line 22 and the cathodes in common to the collector of transistor 30. In such an arrangement, an interrogation pulse is applied to the base of the transistor 30, turning the transistor on, such that all light emitting diodes 18 coupled to lines 22 having closed contacts 24 will glow and those coupled to open contacts will not. The remaining structure and operation of the scanner remains as set forth above.

It will be apparent that, through the use of the light emitting diode matrix 10 and charge coupled device 12, the noise isolation between the electromechanical contacts 24 in the subscriber lines 22 and the electronic switching system which would access the scanner is maintained at a high level.

From the foregoing description it will be seen that the applicant has provided a new and novel electronic line scanner whereby the objectives set forth hereinabove are efficiently achieved. Since certain changes in the above-described construction will occur to those skilled in the art without departure from the scope of the invention it is intended that all matter contained in the preceding description or shown in the appended drawing shall be interpreted as illustrative and not in a limiting sense.

Having described what is new and novel and desired to secure by Letters Patent, what is claimed is:

1. An electronic line scanner for monitoring the status of selectively conducting electrical contacts in a plurality of signal lines, said scanner comprising an array of scanpoints each coupled to one of said plurality of signal lines to be monitored and including a light emitting element responsive to the passage of electrical current therethrough to emit light energy, a source of d.c. potential coupled to each of said scanpoints such that an electrical current is passed through each said light emitting element coupled to a corresponding signal line having electrical contacts which are in a conducting state, a charge coupled semiconductor device having an array of potential wells therein, disposed adjacent and in register with said scanpoint array, responsive to light emitted by said light emitting elements to produce a minority charge accumulation distribution in any potential wells adjacent a lighted light emitting element, and having an output means associated with each column of said array of potential wells, means coupled to said charge coupled semiconductor device for serially shifting said accumulated minority charges through linearly adjacent potential wells to said output means, and means coupled to the output means of said charge coupled semiconductor device for identifying light emitting elements which are lighted thereby indicating those signal lines having electrical contacts which are in a conducting state.

2. A scanner as recited in claim 1 further including a light opaque mask having a plurality of apertures therethrough disposed between said scanpoint array and said charge coupled semiconductor device, said apertures being in alignment with the light emitting elements of said scanpoint array and the potential wells of said charge coupled semiconductor device.

3. A scanner as recited in claim 1 wherein said charge coupled semiconductor device comprises a substrate layer of silicon, and a layer of silicon dioxide disposed on said substrate.

4. A scanner as recited in claim 3 wherein said identifying means includes a metal oxide semiconductor random access memory disposed on said substrate layer and coupled to said charge coupled semiconductor device output means whereby the serial shifting of said accumulated minority charges through said charge coupled semiconductor device introduces a binary indication of the status of each said signal line contacts into the storage cells of said memory.

5. A scanner as recited in claim 1 wherein said identifying means includes an information storage medium coupled to the output means of said charge coupled semiconductor device and adapted to store the identity of said signal lines having electrical contacts which are in a conducting state.

6. A scanner as recited in claim 5 wherein said information storage medium is a random access memory.

7. A scanner as recited in claim 6 wherein said random access memory is integrally formed with said charge coupled semiconductor device.

8. A scanner as recited in claim 1 wherein each said light emitting element is a light emitting diode having an anode coupled to said signal line and a cathode coupled to said source of d.c. potential such that electrical current is coupled through said light emitting diode when said electrical contacts are in a conducting state.

9. A scanner as recited in claim 8 further including means for selectively coupling said source of d.c. potential through said scanpoints to said signal lines.

10. A scanner as recited in claim 9 further including a current sink diode having an anode coupled to the anode of said light emitting diode and a cathode coupled to said selective coupling means, said selective coupling means being operative to normally couple said d.c. potential through said current sink diode to said signal line and to selectively interrupt the application of said d.c. potential to said current sink diode such that electrical current is selectively coupled through said light emitting diode when said electrical contacts are in a conducting state.

11. A scanner as recited in claim 10 wherein said selective coupling means comprises an npn transistor having an emitter coupled to said source of d.c. potential, a collector coupled in parallel to the cathode of each said current sink diodes in said scanpoint array, and responsive to the appli-cation of a control signal to the base thereof to interrupt the application of said d.c. potential to said current sink diodes.

12. A scanner as recited in claim 10 further including a diode having a cathode coupled to said source of d.c. potential and an anode coupled in parallel to the cathode of each said light emitting diode in said scanpoint array.

* * * * *